United States Patent [19]
Rooke

[11] Patent Number: 4,635,985
[45] Date of Patent: Jan. 13, 1987

[54] SELF-PIVOTING ROBOTIC GRIPPER TOOL
[75] Inventor: Paul A. Rooke, Austin, Tex.
[73] Assignee: International Business Machines Corporation, Armonk, N.Y.
[21] Appl. No.: 614,629
[22] Filed: May 29, 1984
[51] Int. Cl.⁴ .............................................. B25J 15/00
[52] U.S. Cl. ...................................... 294/2; 294/86.4; 294/119.1; 414/736; 901/39; 901/40
[58] Field of Search ...................... 901/30, 27, 28, 29, 901/36, 39, 40; 294/86 R, 2, 86.4, 65.5, 119.1; 414/736, 732, 733, 737, 741, 744 C

[56] References Cited
U.S. PATENT DOCUMENTS

| 3,362,550 | 1/1968 | Kappler | 414/734 |
|---|---|---|---|
| 3,367,523 | 2/1968 | Bowman | 414/734 |
| 4,062,601 | 12/1977 | Pardo et al. | 308/2 |
| 4,091,943 | 5/1978 | Bay-Schmith | 414/734 X |
| 4,098,088 | 7/1978 | Mason | 901/30 X |
| 4,099,762 | 7/1978 | Multdin et al. | 294/119.4 |
| 4,310,958 | 1/1982 | Balaud et al. | 29/26 |
| 4,370,091 | 1/1983 | Gagliardi | 414/735 |
| 4,398,863 | 8/1983 | Shum | 414/733 |
| 4,421,451 | 12/1983 | Higgins | 414/739 |
| 4,488,746 | 12/1984 | Inaba et al. | 294/86 R |

FOREIGN PATENT DOCUMENTS

| 68769 | 1/1983 | European Pat. Off. | 901/29 |
|---|---|---|---|
| 8204007 | 5/1982 | Japan | 901/29 |

OTHER PUBLICATIONS

Japan Industrial Robot Association, "The Deltix Spot Welding Robot in the Automotive Industry"; Caprioglio, Liugi, 11/1974.

Primary Examiner—Joseph E. Valenza
Assistant Examiner—David A. Bucci
Attorney, Agent, or Firm—J. F. Villella, Jr.

[57] ABSTRACT

A robotic gripper tool pivots under the force of gravity to orient itself to enable the actuation of a selected gripping surface. The self-pivoting action is accomplished solely by the force of gravity acting upon the mass distribution of the tool with respect to the pivot axis of the tool. Several different gripping surfaces are provided on the tool whereby time consuming tool changes are substantially eliminated. The gripper tool is pivotally connected to a robotic arm. By pitching the robotic arm, the self-pivoting tool will be positioned by the gravitational force acting upon it.

2 Claims, 9 Drawing Figures

SELF-PIVOTING ROBOTIC GRIPPER TOOL

TECHNICAL FIELD

This invention relates to a robotic gripper tool capable of self-pivoting under the force of gravity thereby enabling the operation of several different gripping surfaces.

BACKGROUND ART

The use of robotic manipulators has become increasingly widespread. A typical robotic manipulator comprises an arm having a gripping tool attached at its end. The arm positions the gripping tool adjacent to a work piece that is to be operated upon and a gripping surface on the tool engages the work piece. The arm and the gripping tool are typically driven to the proper orientation for the gripping operation using an external energy source. As is well known, common energy sources currently being used are hydraulics, air, and electricity.

Since both the arm and the gripping tool are externally powered, each time a gripping operation is to be performed power must be supplied to both the arm and the gripping tool. Due to the multitude of orientations that can be required in order to move a work piece, the design and manufacture of robotic manipulators can become quite complex. It would be desirable to reduce the complexity of construction of such robotic manipulators without diminishing their working capability. It would also be desirable to minimize the number of external energy sources required to drive a robotic manipulator through the various required orientations.

In an environment where several different sized and/or shaped work pieces are to be operated upon, it has been necessary to provide a plurality of dedicated tools to attach to the end of the robotic arm. Each time a new operation is performed, one gripping tool must be removed while a second one is subsequently attached to the robotic arm. This has two distinct disadvantages. First, the process cycle time is significantly increased each time a tool change is required. Second, several different tools have to be positioned in an area easily accessible to the robotic arm. Additionally, means have to be provided for easily interchanging tools. The result of using a plurality of single purpose tools is that the robotic manipulator requires a significant amount of space and is also limited by the number of times a tool change needs to be made. The problem of required space also limits the accessibility of the robotic manipulator in confined areas because the robotic arm must be long enough to reach each of the required gripping tools.

DISCLOSURE OF THE INVENTION

It is a principle object of this invention to provide an improved robotic manipulator.

It is another object of this invention to provide a robotic gripping tool which self-pivots under the force of gravity.

It is a further object of this invention to provide a robotic gripping tool with several gripping surfaces each capable of handling a different size or shape work piece.

It is still another object of this invention to provide a robotic gripping tool with ready accessibility to substantially confined areas.

These and other objects are accomplished by a multi-surface gripping tool which self-pivots due to its mass distribution under the force of gravity. The gripping tool is connected to a robotic arm using a pair of robotic gripper clamps. The gripping tool has three orthogonally oriented gripping surfaces which can pivot around a shaft held in place by the robotic gripper clamps. When it is desired to change gripping surfaces or to change the orientation of a given gripping surface, the clamps release and allow the tool to pivot around its central axis. Movement of the robotic arm controls the pivotal movement of the gripping tool to the desired orientation. No external energy sources are required to be supplied to the gripping tool itself for reorientation.

Two of the orthogonally located gripping surfaces behave as a vise thus allowing a work piece to be clamped there-between. Each of these vise surfaces also has a V-groove in it to enable the clamping of a cylindrical work piece. Additionally, one of the pairs of vise surfaces has a pair of pins for engaging work pieces with apertures. Both of the vise gripping surfaces may also be inserted into a hollow cylindrical work piece for gripping the inner surface of such work piece by exerting an outward force on the cylindrical work piece.

The third gripping surface on the tool comprises a magnet for attracting magnetic objects. Each of the aforementioned gripping surfaces may be used one at a time or they may be used in combination to pick and place more than one work piece during a single operation.

BEST MODE FOR CARRYING OUT THE INVENTION

Figure 1:
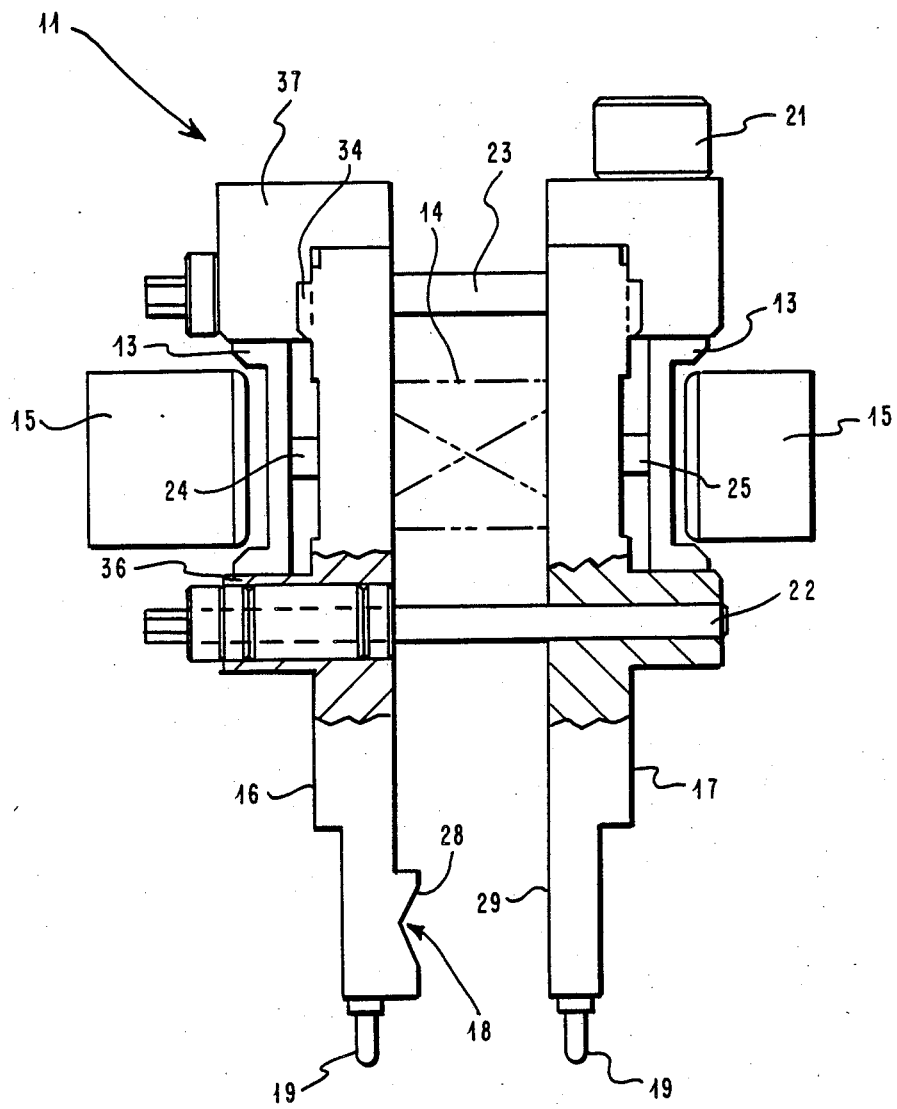
FIG. 1 is a top view of the robotic gripping tool including the gripping clamps.

Referring to FIG. 1, robotic gripping tool 11 comprises two pairs of main body elements, main blocks 16 and 17 and outer positioning blocks 13. Spring 14 provides an outwardly extending force on main blocks 16 and 17 forcing them against outer positioning blocks 13. Robotic gripping clamp 15 which is connected to arm 12 (see FIG. 5) provides a force on blocks 13 and main blocks 16 and 17 in an opposite direction to that provided by spring 14. Rods 22 and 23 which connect blocks 16 and 17 limit the maximum separation between blocks 16 and 17.

Main block 16 has a V-groove 18 for enabling the clamping of cylindrical objects between blocks 16 and 17. Both main blocks 16 and 17 have pins 19 attached thereto for engaging one or more work pieces. For example, pins 19 on blocks 16 and 17 may be used together to clamp onto a work piece having two or more apertures therein. Likewise, either of pins 19 may be used singly to clamp onto a work piece having a single aperture therein. Magnet 21 which is attached to main block 17 facilitates the handling of magnetic materials.

Connected to each of outer positioning blocks 13 are shafts 24 and 25. Shaft 24 fits into an opening in main block 16, while shaft 25 fits into an opening in main block 17. When clamps 15 release thus allowing blocks 13 to separate from main blocks 16 and 17, gripping tool 11 is allowed to pivot about shafts 24 and 25. The pivoting action of gripping tool 11 will be explained in more detail hereinafter in relation to FIGS. 5 through 9.

Figure 4:
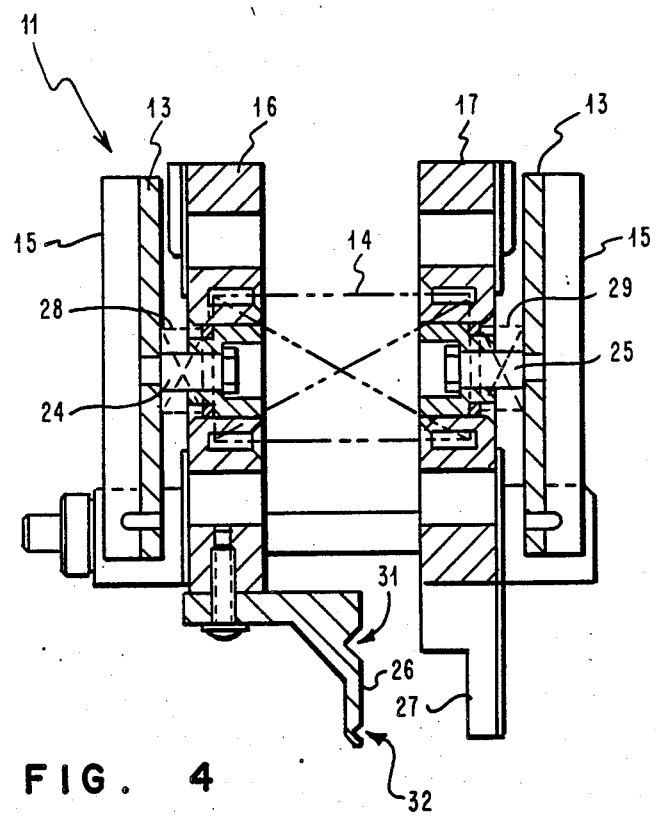
FIG. 4 is a side view perpendicular to the pivot axis of the robotic gripping tool.

Referring now to FIG. 4, it is seen that main blocks 16 and 17 also have clamping surfaces 26 and 27 attached thereto. Clamping surfaces 26 and 27 are substantially orthogonal to the clamping surfaces 28 and 29. Analogously to V-groove 18 in clamping surface 28, clamping surface 26 has a pair of V-grooves therein for clamping cylindrical shaped work pieces. V-groove 31 handles larger diameter work pieces than V-groove 32. The location of pivot shafts 24 and 25 is shown more clearly in FIG. 4.

In operation, when it is desired to pivot robotic gripping tool 11 about shafts 24 and 25, robot grippers 15 release, i.e., they move outwardly away from outer positioning blocks 13. This release of robotic grippers 15 enables outer positioning blocks 13 to move away from main blocks 16 and 17 under a spring force, thereby allowing main blocks 16 and 17 to pivot on shafts 24 and 25. The spring force is provided by a spring coiled around each of shafts 24 and 25. Thus there is a spring 28 between blocks 13 and 16 and also a spring 29 between blocks 13 and 17. No external energy sources are required to pivot robotic gripping tool about shafts 24 and 25. Tool 11 pivots around shafts 24 and 25 solely due to the mass distribution of gripper tool 11 under the force of gravity.

Robotic gripper tool 11 is constructed of steel. The use of steel or a similar dense material is preferred over a less dense material such as aluminum. The heavier material facilitates the pivotal movement of tool 11.

Figure 2:
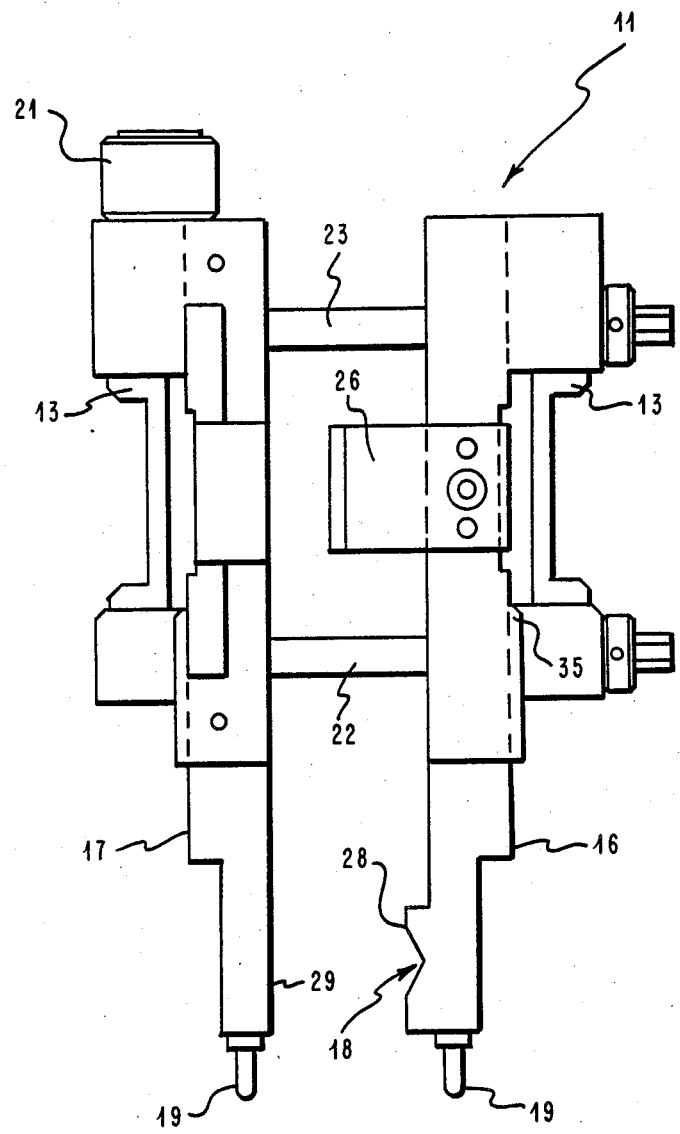
FIG. 2 is a bottom view of the robotic gripping tool.
Figure 3:
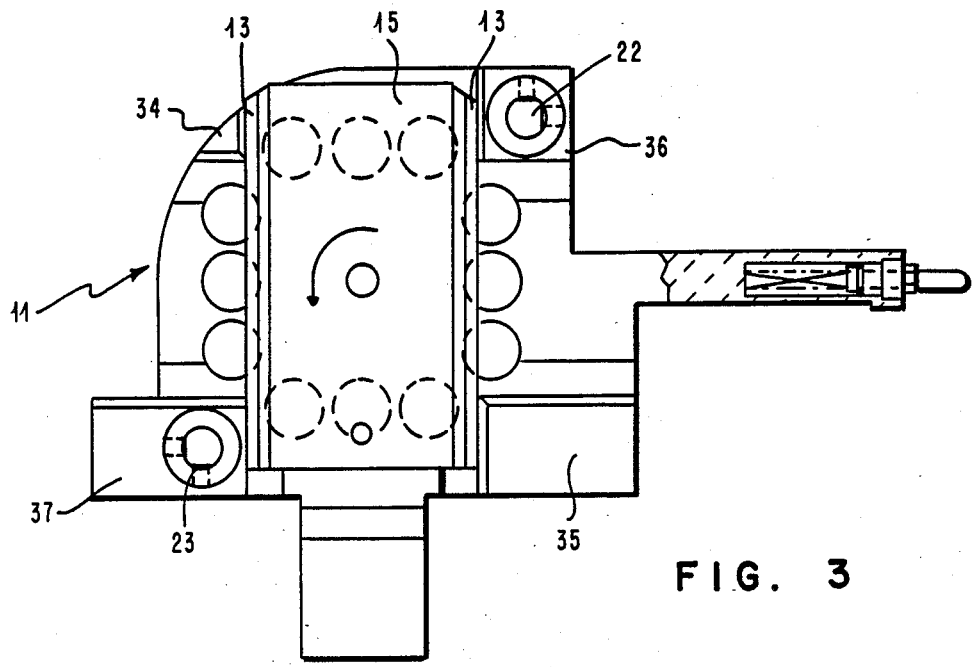
FIG. 3 is a side view of the robotic gripping tool in isolation.
Figure 5:
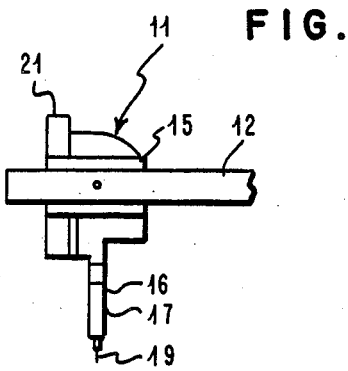
FIGS. 5 through 9 detail a sequence during which the robotic gripping tool is reoriented.

A pivoting sequence of gripper tool 11 will now be described with respect to FIGS. 5 through 9. As seen in FIG. 5, robotic arm 12 is in a horizontal position with the pin side of main blocks 16 and 17 pointing downward. At this time, robotic gripping clamps 15 are engaged thus locking outer positioning blocks 13 with respect to main blocks 16 and 17. In this position, robotic gripping tool 11 is incapable of pivoting about shafts 24 and 25. The locking of outer positioning blocks 13 with respect to main blocks 16 and 17 is shown more clearly in FIG. 3. Clamps 15 push blocks 13 so that they are seated between parts 34, 35, 36, and 37 of main block 16. When clamps 15 are in this position, outer positioning blocks 13 are incapable of movement between parts 34 through 37. Parts 34 and 35 are of a first height while parts 36 and 37 are of a second height greater than the height of parts 34 and 35. Part 35 is seen only in FIG. 2.

When gripping clamps 15 release, outer positioning blocks 13 move beyond the height of parts 34 and 35. This position is shown in FIG. 1. At this time, outer positioning blocks 13 are capable of rotating in the direction of the arrow. Outer positioning blocks 13 may continue rotating in this direction until they come into contact with parts 36 and 37. Recall that the height of parts 36 and 37 is greater than that of parts 34 and 35. Even when clamps 15 are released, outer positioning blocks 13 do not extend beyond the height of blocks 36 and 37. Thus, blocks 36 and 37 behave as a stop, thereby limiting the counterclockwise movement of outer positioning blocks 13.

Figure 6:
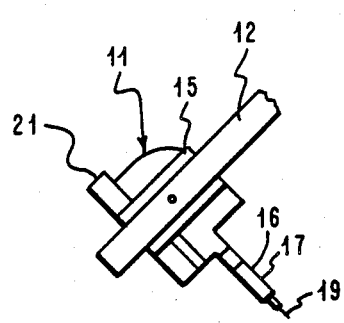
Figure 8:
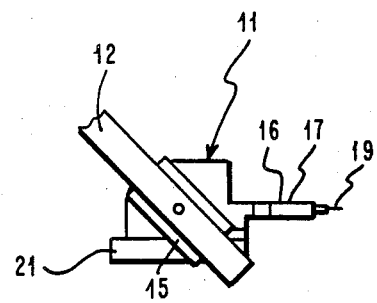
Figure 7:
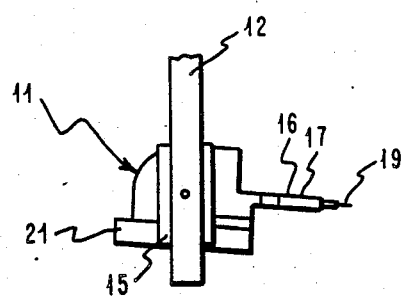

In FIG. 6, gripping clamps 15 have released thus allowing outer positioning blocks 13 to move away from main blocks 16 and 17. At this point, robotic arm 12 has moved approximately 45 degrees away from its original horizontal position. However, as can be seen, the angular orientation between arm 12 and the pinned end sections of main blocks 16 and 17 has remained substantially unchanged. In FIG. 7, arm 12 has moved to a substantially vertical position and gripping tool 11 has begun to pitch forward. The counterclockwise movement of arm 12 continues through the position shown in FIG. 8. As can be seen in FIGS. 7 and 8, gripping clamps 15 have remained in alignment with robotic arm 12.

Figure 9:
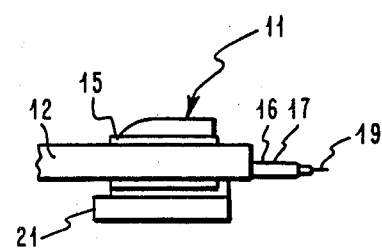

Finally in FIG. 9, robotic arm 12 has moved a full 180 degrees in a counterclockwise rotation. When this position is reached, robotic gripping clamps 15 are activated thereby locking outer positioning blocks 13 between parts 34 and 35 as well as between parts 36 and 37. At this time, robotic gripping tool 11 is no longer capable of pivotal movement about shafts 24 and 25. At this point, the pinned ends of main blocks 16 and 17 have a substantially horizontal orientation. Additionally, gripping surfaces 26 and 27 of main blocks 16 and 17 may now be engaged to handle a work piece located on the underside of gripping tool 11.

The movement of robotic arm 12 and robotic gripping tool 11 from the position shown in FIG. 5 to the position shown in FIG. 9 is for illustrative purposes only. The final orientation of gripping tool 11 with respect to the position of arm 12 depends on the mass distribution of gripping tool 11 under the force of gravity. No external energy sources need to be applied to tool 11 to either initiate or terminate a pivoting sequence. By pitching arm 12, tool 11 will be positioned by the gravitational force acting upon it. Arm 12 is pivotally connected at one end to a support (not shown) and at the other end is pivotally connected to tool 11. The mass of arm 12 at the end connected to tool 11 is greater than the mass of arm 12 at the end connected to the support.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A robotic gripper tool having a plurality of separately actuable gripping surfaces, each of which is oriented by a self-pivoting action of said robotic gripper tool under gravitational force, comprising:

a first pair of opposed body members, each of said first pair of opposed body members having an aperture along a common axis, wherein said first pair of opposed body members forms a first and a second pair of gripping surfaces, said second pair of gripping surfaces located substantially orthogonal to said first pair of gripping surfaces; and, a second pair of opposed body members, the inner surfaces of said second pair abutting the outer surfaces of said first pair of opposed body members, each of said second pair of opposed body members having a shaft fittable into an adjacent aperture in said first pair of opposed members, whereby said first pair of opposed body members is pivotable with respect to said second pair of opposed body members about said common axis.

2. A robotic gripping tool according to claim 1 wherein said first pair of opposed body members further comprises a magnet gripping surface on one of said opposed body members.

* * * * *

UNITED STATES PATENT AND TRADEMARK OFFICE
CERTIFICATE OF CORRECTION

PATENT NO. : 4,635,985
DATED : January 13, 1987
INVENTOR(S) : P. A. Rooke

It is certified that error appears in the above—identified patent and that said Letters Patent is hereby corrected as shown below:

Col. 4, line 60, before "members" insert --body--.

Col. 4, line 64, "gripping" should read --gripper--.

Signed and Sealed this

Tenth Day of November, 1987

Attest:

DONALD J. QUIGG

*Attesting Officer*  *Commissioner of Patents and Trademarks*